US012597339B2

(12) United States Patent
Clifford et al.

(10) Patent No.: US 12,597,339 B2
(45) Date of Patent: Apr. 7, 2026

(54) TOKENIZATION FOR ON-DEMAND TRAFFIC RESOURCE ALLOCATION

(71) Applicant: Cavnue Technology, LLC, Arlington, VA (US)

(72) Inventors: David Hahn Clifford, Royal Oak, MI (US); Robert Michael Morgan, Montara, CA (US); Piotr Bartlomiej Dubla, Cupertino, CA (US)

(73) Assignee: Cavnue Technology, LLC, Arlington, VA (US)

( * ) Notice: Subject to any disclaimer, the term of this patent is extended or adjusted under 35 U.S.C. 154(b) by 307 days.

(21) Appl. No.: 18/189,970

(22) Filed: Mar. 24, 2023

(65) Prior Publication Data

US 2024/0321086 A1 Sep. 26, 2024

(51) Int. Cl.
*G08G 1/01* (2006.01)
*G08G 1/017* (2006.01)

(52) U.S. Cl.
CPC ........... *G08G 1/0125* (2013.01); *G08G 1/017* (2013.01)

(58) Field of Classification Search
None
See application file for complete search history.

(56) References Cited

U.S. PATENT DOCUMENTS

2014/0195138 A1 7/2014 Stelzig et al.
2019/0063938 A1 2/2019 Fukushima et al.
2019/0132709 A1 5/2019 Graefe et al.
2020/0234575 A1* 7/2020 Hishida ................ G08G 1/0145
2021/0304591 A1* 9/2021 Small ..................... G01C 21/34
2021/0318691 A1 10/2021 Amnini et al.

OTHER PUBLICATIONS

Mohandes, M. et al., “An Intelligent System for Vehicle Access Control using RFID and ALPR Technologies,” Apr. 16, 2016, Springer, Arabian Journal for Science and Engineering (2016) vol. 41, pp. 3521-3530 (Year: 2016).*

Alharbi, Fares et al., “Intelligent Transportation Using Wireless Sensor Networks Blockchain and License Plate Recognition,” Feb. 28, 2023, MDPI, Sensors 2023, 23(5), 2670, pp. 1-23 (Year: 2023).*

Hu et al., “A Multirange Vehicle Speed Prediction With Application to Model Predictive Control-Based Integrated Power and Thermal Management of Connected Hybrid Electric Vehicles,” Journal of Dynamic Systems, Measurement, and Control, Jan. 2022, 144:011105-1-011105-11.

* cited by examiner

*Primary Examiner* — Madison R. Inserra
(74) *Attorney, Agent, or Firm* — Fish & Richardson P.C.

(57) ABSTRACT

Systems and techniques are described for on-demand traffic resource allocation. A system determines, for a traffic resource allocation request for a vehicle, a tracking capability for the vehicle. The tracking capability can be one of multiple different tracking capabilities, and tracking capability enables a tracking of a vehicle by a tracking method that is unique to the tracking capability and different from each other tracking capability. The system generates, for the vehicle, a tracking token that includes data that describes the tracking capability determined for the vehicle and that enables the traffic resource allocation system to track the vehicle using the tracking token and according to the tracking capability. The system then enables tracking of the vehicle according to the tracking capability described by the data in the tracking token.

15 Claims, 3 Drawing Sheets

| Tracking Capability | Token Subset | <PARAM> |
|---|---|---|
| RFID | 0A1 | <RFID#> |
| ADDRESS | 0B1 | <MACADDRESS#> |
| VISUAL | 0C1 | <LICENSE #] |

TOKENIZATION FOR ON-DEMAND TRAFFIC RESOURCE ALLOCATION

BACKGROUND

Intelligent traffic and roadway management systems monitor roadway conditions and traffic to determine traffic patterns, to detect roadway anomalies and obstacles, and to determine other information that can be used to manage traffic routing and flow. Some intelligent traffic management systems communicate directly with the vehicles. For example, an intelligent transportation system (ITS) may be able to sense vehicle traffic on a roadway and communicate with autonomous vehicles on the roadway to efficiently manage vehicle traffic by allocating to the vehicle access to lanes, etc., at certain times.

However, not all vehicles are capable of communicating with an ITS system, such as "legacy vehicles" that are not equipped with communication and processing devices that communicate with the ITS. Likewise, some vehicles may not have compatible communication capabilities to communicate with a particular ITS. Moreover, there are many sections of roadway for which access is controlled by third parties (e.g., state tollways) that are not controlled by an ITS.

SUMMARY

This subject matter described below enables legacy vehicles and other vehicles that cannot communicate with an ITS to be managed by an ITS and thereby enable the ITS to allocate traffic resources to the vehicle. Optionally or in additional, the subject matter described below enables traffic resources controlled by third parties that normally grant access to and track vehicles using third-party devices, e.g., state toll authorities that utilize RFID readers, to grant access to and track vehicles that do not have the third-party devices, or that do not even have an account with the third party. The enablement of such capabilities can be done on-demand by a user/driver of a vehicle.

In general, one innovative aspect of the subject matter described in this specification can be embodied in methods that include the actions of receiving, by the traffic resource allocation system, for each of a plurality of vehicles, a request for an allocation of a traffic resource for the vehicle in a traffic environment, and for each vehicle: determining, by the traffic resource allocation system, a tracking capability for the vehicle, the tracking capability being one of a plurality of different tracking capabilities, wherein each tracking capability enables a tracking of a vehicle by a tracking method that is unique to the tracking capability and different from each other tracking capability; generating, for the vehicle, a tracking token that includes data that describes the tracking capability determined for the vehicle and that enables the traffic resource allocation system to track the vehicle using the tracking token and according to the tracking capability; and enabling, by the traffic resource allocation system, tracking of the vehicle according to the tracking capability described by the data in the tracking token. For at least a first vehicle of the plurality of vehicles, a first tracking capability is determined, and for a second vehicle, a second tracking capability different from the first tracking capability is determined, and a first process to track the first vehicle according to the first tracking capability is different from a second process to track the second vehicle according to the second tracking capability.

In an optional feature, data that describes the tracking capability determined for the vehicle and that enables the traffic resource allocation system to track the vehicle using the tracking token and according to the tracking capability comprises a tuple that includes: a first parameter that has a plurality of values, wherein a value of the first parameter specifies a particular tracking capability; a second parameter that has a value that is used to identify one of the vehicle or device within the vehicle when tracking according to the particular tracking capability specified by the value of the first parameter.

In an optional feature, the plurality of values for the first parameter include: a first value that specifies an RFID tracking capability; a second value that specified a network address capability; and a third value that specifies a license plate number capability.

In an optional feature, enabling, by the traffic resource allocation system, tracking of the vehicle according to the tracking capability described by the data in the tracking token comprises providing, by the traffic resource allocation system, the token to a plurality of sensors that are used to track vehicles that are using the traffic resource.

In an optional feature, enabling, by the traffic resource allocation system, tracking of the vehicle according to the tracking capability described by the data in the tracking token comprises providing, by the traffic resource allocation system, the token to system that is separate from the traffic resource allocation system and controlled by an entity that is separate from the entity that controls the traffic resource allocation system.

In an optional feature, the traffic resource is an access to a restricted vehicle lane over a pathway.

In an optional feature, the operations further comprise, for each of one or more allocations of a traffic resource: generating data describing the traffic resource allocated in response to the request; and sending, to a user device, the data describing the traffic resource allocated in response to the request.

In an optional feature, enabling, by the traffic resource allocation system, tracking of the vehicle according to the tracking capability described by the data in the tracking token comprises providing, by the traffic resource allocation system, the token to a mobile phone device of a user that sent the request for an allocation of a traffic resource for the vehicle.

Other embodiments of this aspect include corresponding systems, apparatus, and computer programs, configured to perform the actions of the methods, encoded on computer storage devices.

The systems and methods described above may realize one or more of the following advantages. A system can allocate a traffic resource to a vehicle in an on-demand manner, and the particular tracking capability selected can be dependent on the specified tracking capability for the vehicle. This allows an intelligent transportation system, or a third-party system, to manage traffic resources for vehicles that may have no pre-association with the systems or do not have the ability to communicate with the system. The use of a token, which specifies the tracking capability that can be used for the vehicle, eliminates the need for any specialized end-device on the vehicle, which reduces hardware costs and simplifies system implementation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
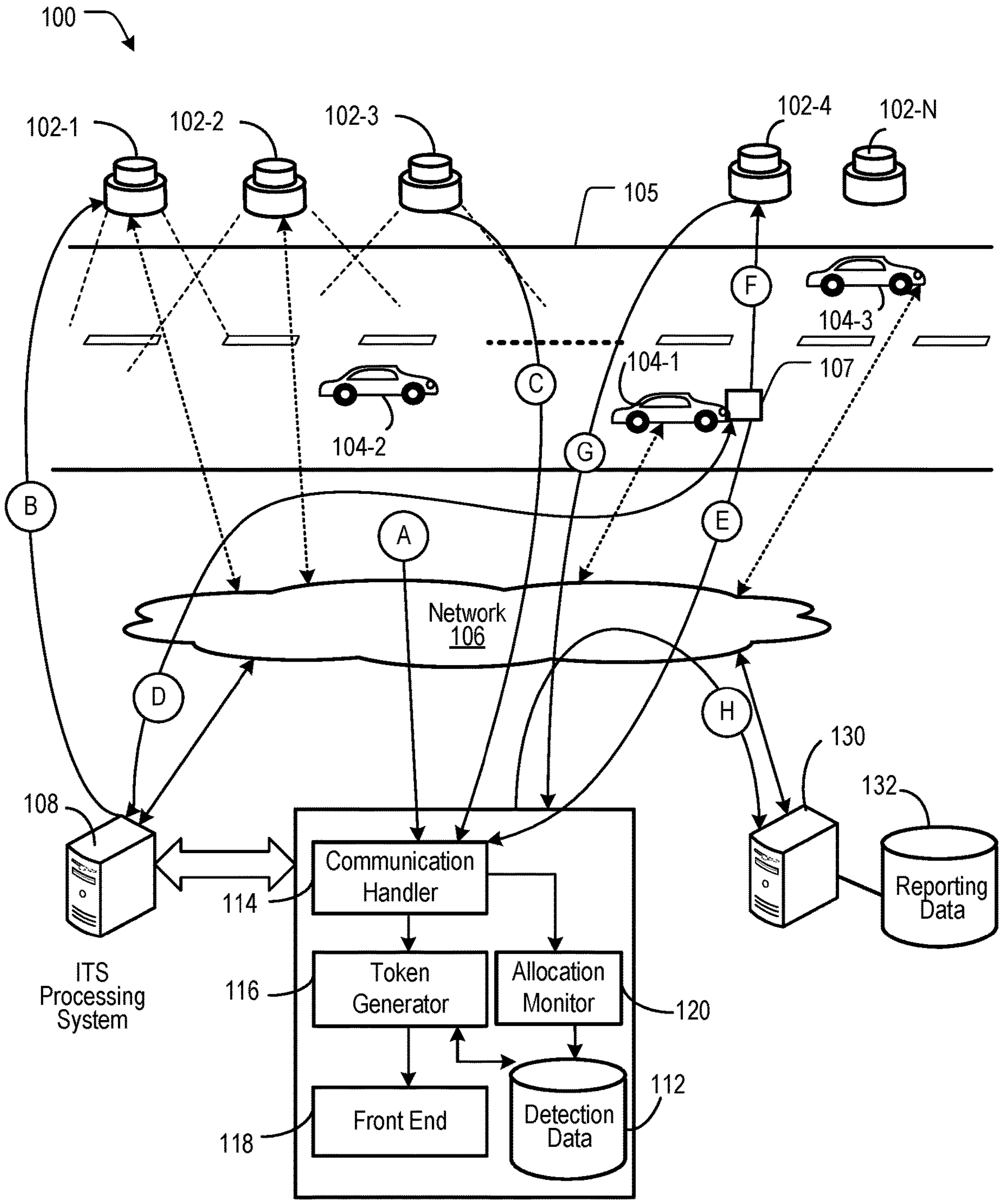
FIG. 1 is a block diagram of an example environment in which a tokenization for on-demand traffic resource allocation is implemented.

The subject matter described below enables legacy vehicles and other vehicles that cannot communicate with an ITS to be tracked by the ITS so that the ITS can allocate traffic resources to the vehicle. Optionally or in addition, the subject matter described below enables traffic resources controlled by third parties that normally grant access to and track vehicles using third-party devices, e.g., state toll authorities that utilize RFID readers, to grant access to and track vehicles that do not have the third-party devices, or that do not even have an account with the third party. The enablement of such capabilities can be done on-demand by a user/driver of a vehicle.

In operation, a traffic resource allocation system receives, for each of a plurality of vehicles, a request for an allocation of a traffic resource for the vehicle in a traffic environment. For example, a first user may request access to a lane controlled by an ITS, but the first user does not drive a vehicle that communicates with the ITS. A second user may request access to a state toll road, but the second user does not have an account or an RFID tag for the state toll road.

The traffic resource allocation system determines that the vehicle is to be allocated the traffic resource. For example, the first user may be allocated a 10 mile path on a lane controlled by the ITS, and the second user may be allocated a 15 mile section of the tollway.

For each request, the traffic resource allocation system determines a tracking capability for the vehicle. The tracking capability is one of a plurality of different tracking capabilities, and each tracking capability enables a tracking of a vehicle by a tracking method that is unique to the tracking capability and different from each other tracking capability. For example, for the first vehicle, the roadway controlled by the ITS may have sensors alongside the roadway that can read IP addresses a mobile device or a device embedded onboard a vehicle. For the second vehicle, the state tollway may include license plate readers that scan the plates of vehicles that enter the roadway without an RFID tag.

For each request, the traffic resource allocation system generates, for the vehicle, a tracking token that includes data that describes the tracking capability determined for the vehicle and that enables the traffic resource allocation system to track the vehicle using the tracking token and according to the tracking capability. For example, for the first vehicle, the tracking token may specify a first value that indicates a network/MAC address tracking capability, and a second value that is the network/MAC address device to be tracked. For the second vehicle, the token may include a value that indicates a license plate tracking capability, and a second value that is the license plate number to be tracked.

For each request, the traffic resource allocation system enables tracking of the vehicle according to the tracking capability described by the data in the tracking token. For example, for the first vehicle, the traffic resource allocation system may distribute the token to roadside sensors within the ITS for tracking the vehicle. Conversely, for the second vehicle, the traffic resource allocation system may provide the token to a state tollway authority. When the state tollway authority detects a vehicle entering without a state-issued RFID reader, the license plate of the vehicle can be reconciled against the license plate specified by the token (or a hash of the detected license plate value can be reconciled against a hash specified by the token). If there is a match, then there is no violation. In some implementations, the requesting user may have an account with the traffic resource allocation system and provides payment for access to the state tollway, and the state authority and the traffic resource allocation system operate per a revenue sharing agreement.

As used herein, a "traffic resource" is access to a particular lane, preferential routing status, or any other traffic-related resource that expedites travel time, provides vehicles access to a particular section of road, provides vehicle access to a parking space, or provides preferential routing over other vehicles.

These features and additional features are described in more detail in the claims that follow.

Example Environment

FIG. 1 is a block diagram of an example environment 100 in which tokenization for on-demand traffic resource allocation is implemented. In the example environment, a traffic management system, such as an intelligent transportation management system, is deployed along a road 105 on which vehicles 104-1, 104-2 and 104-3 (collectively "vehicles 104") travel.

The intelligent transportation system includes a plurality of sensors 102-1 through 102-N (collectively "sensors 102") that report to an ITS processing system 108, which may be a central server system that implements an on-demand traffic resource allocation as one of several subsystems. In the example implementation shown, the ITS system 108 includes a detection data store 112, a communication handler 114, a token generator 116, and a front end 118. Operation of these components is described in more detail below. The system 108 implements the communication handler 114, the token generator 116, and the front end 118 using one or more processors that are programmed to perform the operations described. Moreover, while the communication handler 114, the token generator 116, and the front end 118 are described as separate software implements, they can be combined into a single software implement, or implemented by some other appropriate architecture.

The road 105 includes multiple lanes in a particular direction lined by sensors 102. The sensors 102 situated along the road 105, e.g., sensors 102-1 through 102-N, generate sensor data regarding particular events on the road 105, e.g., vehicle moving on the road in a particular direction or a vehicular car accident. The ITS processing system 108 processes the sensor data that not only describes the vehicle or the event but can also describe a location of the object within a lane of the road 105, a speed of that vehicle, a speed headway of the vehicle, and the relationship of that vehicle to other vehicles. Moreover, the system can generate and monitor sensor data in a similar manner for multiple events as well as, multiple events detected on the roadway. As used herein, an "event" in the context of the roadway includes traffic conditions (slow traffic, jams, etc.), obstacles on the road (stalled vehicles, debris, water, ice, etc.), emergency vehicles (ambulances, firetrucks, police cruises operating in a manner that requires traffic to yield), or any other condition or obstacle that the sensors and system can detect and identify and that may require a change a driving behavior of the vehicle.

The sensors 102 can include a variety of software and hardware devices that monitor objects on road 105. For example, the sensors 102 can include a LIDAR system, a video camera, a radar system, a Bluetooth® system, and a Wi-Fi® system to name a few examples. A sensor can include a combination of varying sensor types. For example, sensor 102-1 can include a video camera, a radar system, and a motion detection system; sensor 102-2 can include a video camera and a radar system; and sensor 102-N can include a video camera, a LIDAR system, and a Wi-Fi® system. Alternatively, a sensor may just include a single component, such as a LIDAR system. Additionally, other sensor combinations are possible.

The sensors 102 may have overlapping fields of view of adjacent sensors to ensure continuity for viewing the road 105 in its entirety. Additionally, overlapping fields of view regions may facilitate monitoring areas where objects enter the road 105 through vehicle on-ramps or exit the road 105 through vehicle off-ramps. Sensors can also be placed to monitor other areas managed by the system 108, such as parking spaces.

In addition, each sensor 102 can include memory and processing components for monitoring the objects on the road 105. For example, each sensor can include memory for storing a list that tracks the objects identified on the road in the order they appear to a sensor. The processing components can include, for example, video processing, sensor processing, transmission, and receive capabilities. Each of the sensors can also communicate with one another over the network 106 or peer-to-peer.

The ITS processing system 108 can include one or more servers and one or more databases connected locally or over a network. The ITS processing system 108 can store data that represents the sensors along the road 105. For example, the ITS processing system 108 can store data that represents the sensors 102 that are available to be used for monitoring and their locations. The data can indicate which sensors are active, which sensors are inactive, the type of data recorded by each sensor, and data representing the fields of view of each sensor. Additionally, the ITS processing system 108 can store data identifying each of the sensors 102 such as, for example, IP addresses, MAC addresses, and preferred forms of communication to each particular sensor. The data can also indicate the relative positions of the sensors 102 in relation to one another.

In some implementations, each sensor 102 is capable of generating a list on a frame-by-frame basis, and the ITS processing system 108 can also store data representing multiple lists generated by each of the sensors. The list can indicate one or more objects detected by the sensor in the order in which the objects were detected in the sensor's field of view. For example, because each sensor is placed along the road 105 with a segment or portion of the road 105 in the sensor's field of view, the sensor can identify an object as the object enters the sensor's field of view. In response to the sensor detecting an object, the sensor can assign that object a particular identity. The particular identity can include a combination of data that represents distinguishing features of the object. The combination of data can also be time-stamped. After the sensor assigns that object a particular identity, the sensor adds the identity to a list. The list can correspond to a lane space representation of the road segment that the sensor sees on a frame-by-frame basis.

In some implementations, a sensor can expand the list out to a matrix. The matrix can include multiple concatenated lists, where each column of the matrix corresponds to a particular lane on the road 105. In some implementations, a matrix contains lanes for same direction of traffic. Thus, the sensor can encode the lane space of the road in a matrix or some other array representation that is to be understood by all the sensors and ITS processing system in the system 108. Therefore, when the sensor detects and uniquely identifies an object in its field of view and adds that identification to a list, the sensor is tracking a particular object. The next time the sensor detects an object, the sensor will generate a unique representation for that object and add that representation to the list, placing the representation at a row below the identification of the first object. In this manner, the sensor has detected two objects and stored representations of these objects in the order in which they have appeared.

In one example, the sensor may be monitoring two separate lanes, in which vehicles travel in the same direction. If the sensor detects and identifies a new vehicle in the first lane, then the sensor adds the unique representation for that object in the first column of the matrix. If the sensor detects and identifies a new vehicle in the second lane, then the sensor adds the unique representation for that object in the second column of the matrix. This process can occur for N number of lanes (corresponding to N columns in the matrix) monitored by the sensors. Each sensor then monitors the vehicles and the position of the vehicles found in the matrix. Thus, the matrix represents a lane representation of the road when the road includes multiple lanes.

As previously mentioned, when the sensor detects a particular object in its field of view, the sensor generates a unique identity of that object using its distinguishing detected features. Then, the sensor combines the data representing the distinguishing features to generate an Object Identification Characteristic (OIC) that uniquely identifies that object to the sensors. For example, the OIC can include a unique hexadecimal value or a string that describes the observable properties or features of the object. The observable properties can include the object color (as represented by Red-Green-Blue (RGB) characteristics), the object size (as calculated through analytics in the optical characteristics), the object class (as calculated through optical characteristics, and the volume of the object, to name a few examples. In some implementations, a license plate can be used to detect particular vehicles.

Based on the observations of the sensors 102 and the traffic conditions, the system 108 can allocate traffic resources, e.g., HOV lane access, express lane access, other restricted lanes, etc., to vehicles. For example, in the case of an autonomous vehicle, the sensors 102 can receive data from the system 108 and generate instructions that are transmitted to an autonomous vehicle, e.g., vehicle 104-3, to instruct the vehicle to enter an express lane, or exit an express lane, or alter its route. Alternatively, or in addition, the autonomous vehicle 104-3 can communicate directly with the system 108 by means of the network 106, e.g., cellular communication, to receive instructions.

Other vehicles, such as semi-autonomous vehicles, e.g., 104-2, or vehicles always under human control, e.g., 104-1, may not be able to communicate with the sensors 102 or the system 108. However, the systems and methods described below enable the ITS processing system 108 to allocate resources to these vehicles so that the vehicles 104 can be managed by ITS processing system 108. Additionally, in some implementations, the system 108 can also enable a third-party system, e.g., a state toll system 130, to grant temporary toll approval for a vehicle that is not pre-registered in the state toll system 130. Allocation of resources for the ITS roadway is described in the next section, and allocation of resources for a third party is described in the section following the next section below.

Tokenization for On-Demand Resource Allocation in the ITS System

There are multiple ways on-demand resource allocation can be implemented in the ITS system 108, and the particular way of implementation depends on the tracking capability for a particular vehicle. A tracking capability will depend on what communication capabilities, if any, are available for a particular vehicle. If a vehicle 104 cannot directly communicate with the ITS system 108, then tracking capabilities can be visual, e.g., license plate, or by an electronic device, e.g., a mobile device, such as a mobile phone.

Figure 2:
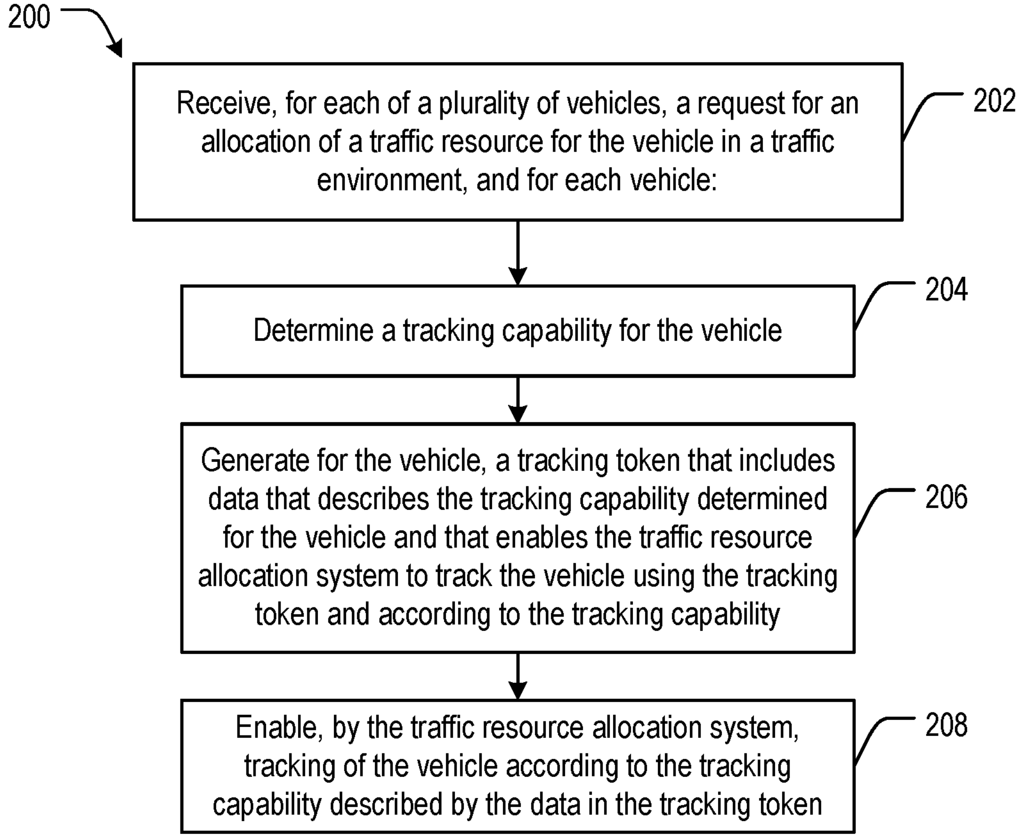
FIG. 2 is a flow diagram of an example process for processing an on-demand traffic resource allocation request.
Figure 3:
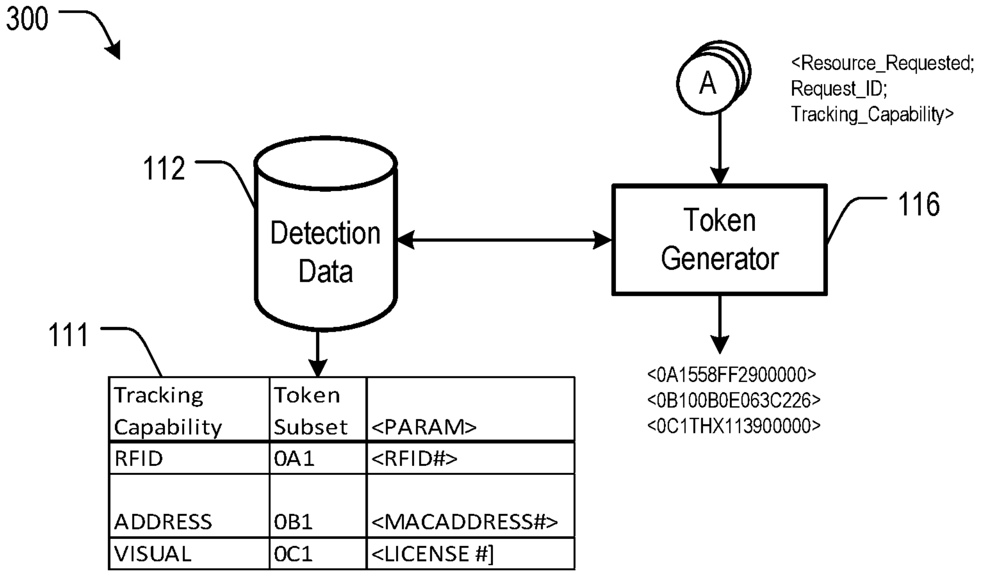
FIG. 3 is a system flow diagram for generating a token based on a resource allocation request.

FIG. 2 is a flow diagram of an example process 200 for processing an on-demand traffic resource allocation request, and FIG. 3 is a system flow diagram 300 for generating a token based on a resource allocation request. More generally, FIGS. 2 and 3 describe an overall process of granting and managing an on-demand traffic resource allocation.

The process 200 can be implemented in one or more computers in data communication with each other, and that are programmed to perform the described operations, such as the ITS processing system 110. The process 200 begins by receiving, for each of multiple vehicles, a request for an allocation of a traffic resource for the vehicle in a traffic environment (202). The request can be sent from a user device, e.g., a computer, a mobile phone, or any other programmable device that can communicate over the network 106. For example, the drivers of vehicles 104-1 and 104-2 may send traffic resource requests. The requests may be sent before a drive begins, or, alternatively, during a drive using a safe practice (e.g., by a passenger). The requested traffic resource may be, for example, an express lane, preferential status among vehicles managed by the intelligent transportation system 108, or any other appropriate traffic resource.

An example request is illustrated in FIG. 3 by flow element A. The request can be a tuple or some other data set that is used to request a resource, e.g., a particular value or set of values represented by Resource_Request, a request identifier that identifies the requestor, e.g., a particular value or set of values represented by Request_ID, and a capability descriptor that describes the capability to be used in tracking the vehicle, e.g., a particular value or set of values represented by Tracking_Capabillity. The request is received and processed by the communication handler 114.

The request can be sent from a user device from which a user can input a request. For example, the front end 118 can include a web interface that allows a user to request the resource, provide a user identifier, and specify a tracking capability, and, if necessary, data for the tracking capability (e.g., an RFID number, a license plate number, etc.). If a user has an account with the system, and the account is identified by the value in the Request_ID field, some of the data for the request will be stored in the detection data, e.g., for a particular user, the tracking capability, and data for that tracking capability, such as a license plate number, a MAC address, and RFID, etc. The data can thus be retrieved from the detection data 112 based on the Request_ID.

The request may specify a particular section of highway for access, preferential treatment along a highway section, a parking location, or any other traffic resource managed by the system 108. The user can input the request by use of a user interface to the system 108.

For each request, the process 200 determines a tracking capability for the vehicle (204). The tracking capability for the request is one multiple different tracking capabilities. Each tracking capability enables a tracking of a vehicle by a tracking method that is unique to the tracking capability and different from each other tracking capability. For example, the token generator 116, for a particular request, determines the data in the Tracking_Capabilty field, and based on the data, determines the tracking capability. Alphanumeric values or any other values can be pre-associated with corresponding tracking capabilities.

The process 200 then generates, for the vehicle, a tracking token that includes data that describes the tracking capability determined for the vehicle and that enables the traffic resource allocation system to track the vehicle using the tracking token and according to the tracking capability (206). The tracking token is data that describes the tracking capability how to identify the vehicle. For example, as illustrated in FIG. 3, the detection data 112 includes a mapping 111 of tracking capabilities to token subsets that identifies the tracking capability. The token subset is data that is included in a token generated for a particular request. Also included is a parameter field <PARAM> that specifies the parameter for the tracking capability. Although only one parameter is specified for reach tracking capability, more than one parameter can be used for a particular tracking capability. The token that is generated will include, as a subset, the data indicating the tracking capability as a first parameter value, and, as a second parameter value, a value that is used to identify one of the vehicle or device within the vehicle when tracking according to the particular tracking capability specified by the value of the first parameter. The token can be a fixed length or a length that is determined by the length of the identifying data. In the case of the former, if the identifying data does not require the entire portion of the token length to be used, the token can be padded with a null values, zeros, etc.

In one example implementation, the token includes the tracking capability data as a leading portion and includes the identifying value as a second portion. As illustrated in FIG. 3, the token generator 116 has generated three tokens for three requests. The first token, <0A1558FF2900000>, is generated for a request that specifies an RFID tracking capability. This token is used by systems that track by RFID readers. The first three values of the token are the token subset to specify the RID tracking capability, and the remaining values are used for the RFID itself. In some implementations, the RFID value may be stored in the detection data 112, such as in the case of a user establishing an account within the ITS system 108, and the Request_ID is used to look up the RFID value. In other implementations, the RFID value may be provided with the request.

The second token, <0B100B0E063C226>, is generated for a request that specifies MAC address tracking capability (or some other type of network address tracking capability). This token is used by systems that track by receiving a MAC address from an electronic device within the vehicle, e.g., a device that is programmed to broadcast it address for tracking while along the route. The first three values of the token are the token subset to specify the MAC address tracking capability, and the remaining values are used for the MAC address itself. In some implementations, the RFID value may be stored in the detection data 112, such as in the case of a user establishing an account within the ITS system 108, and the Request_ID is used to look up the MAC address value. In other implementations, the MAC address value may be provided with the request.

The third token, <0C1THX113900000>, is generated for a request that specifies a visual tracking capability. This token is used by systems that track by visual features, e.g., a license plate number. The first three values of the token are the token subset to specify the visual address tracking capability, and the remaining values are used for the license plate number and padding. In some implementations, the license plate number may be stored in the detection data 112, such as in the case of a user establishing an account within the ITS system 108, and the Request_ID is used to look up the license plate number. In other implementations, the license plate number may be provided with the request.

In another implementation, key/value pairs can be used for the token format. The key to the key/value pair identifies what the value represents and thus does not require any order dependency in the data. This makes for identification for filtering/sharing with other systems easier, and also makes future additions and extensions to the system easier than requiring ordered dependencies. For example, the tracking capability value may be paired with a T key, and the parameter value may be paired with a P key.

Transmission of the token may, in some implementations, include encryption of the token, and optionally, hashing of the parameter value. Receiving systems can then decrypt the received token using a corresponding decryption process. Because the parameter values are typically defined by bounded sets, a collision-free hash function can be selected to hash the parameter values. Tracking systems that may detect parameter values during vehicle transit can then use the same function to identify the presence of the vehicle based on the received token.

After the token is generated, the process 200 enables tracking of the vehicle according to the tracking capability described by the data in the tracking token (208). How the tracking is enabled depends on the tracking capability. Because there are different tracking capabilities that can be determined for different vehicles, each process used to track a vehicle according to a particular capacity may also be different from each other. Examples of enabling different types of tracking capabilities are illustrated by several communication flows that can be used, depending on the tracking capability. Table 1 below references flow paths of flow elements in FIG. 1, each of which describes a particular communication flow for managing on-demand resource allocation based on a vehicle token.

TABLE 1

| Tracking Capability | Flow Path |
|---|---|
| Visual/RIFD | A-B-C |
| Address (Example 1) | A-D-E |
| Address (Example 2) | A-D-F-G |

To enable a visual tracking, the ITS system 108, in response to a resource request A, provides the token to sensors 102-1 . . . . N, as illustrated by flow path B. Additional data, such as a time period for which the resource is to be allocated, and the geographic locations for which the resource is granted, can also be provided. Thereafter, the sensors 102, upon detecting the vehicle according to the visual feature, such as the license plate number of vehicle 104-2, will report the detection back to the system 108, as illustrated by flow path C. In this way, the system 108 can monitor for usage of the allocated resource.

The system 108 can generate and send data to a user device. The data describes the traffic resource allocated in response to the request. For example, in the event that the resource is a parking space (or one of multiple parking spaces), the system 108 can cause a notification to be sent for detection by a driver of the vehicle. The system 108 can send a text message to a mobile device of the user (assuming the mobile device information is available to the system 108, such as when the user has an account with the system or has provided mobile device contact information), e.g., "Parking spaces 122, 127 and 129, which are thirty feet in front of you, are available. Please park in one now." Likewise, in the event that the resource is an express lane, the system 108 can cause a similar notification to be sent for detection by a driver of the vehicle. For example, the system 108 can send a text message to a mobile device of the user, e.g., "Your request for express lane access is granted. An entry is one mile ahead. You may enter there, and you may proceed for fifteen miles and exit at Exit #123. We will send you another notification to remind you as you approach Exit #123."

For another type of tracking, such as RFID tracking, the same flow can be used, i.e., A, B, C, provided the sensors are RFID readers, and the vehicle 104-2 has an RFID reader. The process is similar as described above, except that the sensors, instead of monitoring for a license plate, will monitor for an RFID tag.

For another type of tracking, such as mobile device tracking, a driver of a vehicle may be granted access to a traffic resource by use of the driver's mobile device, e.g., a mobile phone. Here the identifier for tracking may be the mobile number or some other unique address. In some implementations, the mobile device may facilitate self-reporting. For example, in response to the request A, the system 108 may provide the token to the mobile device, as illustrated by flow path D. The mobile device, utilizing a software program that is configured to process the token, will then report its location to the system 108 upon utilization of the requested resource, as illustrated by flow path E. In addition to the token, additional data, such as a time period for which the resource is to be allocated, and the geographic locations and geo-fence data that define the traffic resource that is allocated, can also be provided to the mobile device, with the token, or the mobile device can request the data from the system 108 in response to receiving the token. Upon entering the geo-fenced area, the mobile device 107 begins report its location, e.g., by transmitting back the token, for example. The mobile device 107 acts as a proxy for the vehicle 104-1. The system 108 can then send notifications to the mobile device, as described above. Moreover, the mobile device can determine, based on the data that describes the allocated resource (e.g., time and geo-location), when the resource is no longer available or has been used, and provide a notification to the driver.

In yet another type of tracking, the driver of the vehicle may be granted access to the traffic resource, and the mobile device is configured to report to the sensors 102. For example, in response to the request A, the system 108 may provide the token to the mobile device, as illustrated by flow path D. The mobile device 107, utilizing a software program that is configured to process the token, will then periodically broadcast data for reception by the sensors 102, as illustrated by flow path F. The broadcast can be accomplished by any type appropriate radio frequency communication that the mobile device can be configured to transmit and that the sensors 102 can receive. In some implementations, the transmission can be a low power, personal area network type communication. In addition to the token, additional data, such as a time period for which the resource is to be allocated, and the geographic locations for which the resource is granted, can also be provided to the mobile device, with the token, or the mobile device can request the data from the system 108 in response to receiving the token. The sensors 102, upon detection of the signal, notify the system 108 of the utilization of the resource, as illustrated by flow path G. The system 108 can then send notifications to the mobile device, as described above. Moreover, the mobile device can determine, based on the data that describes the allocated resource (e.g., time and location), when the resource is no longer available or has been used, and provide a notification to the driver.

In some implementations, allocation of a resource can be provided without charge. In other implementations, access to resources can be fee-based. For example, access to an express lane may require a fee. If the user has an account with the system, the fee can be incurred on the user's account. Otherwise, the user may be required to pay the fee prior to the allocation being granted.

Tokenization for On-Demand Resource Allocation in Third-Party System

In another implementation, the system 108 may interface with a third-party system 130 that controls third-party traffic resources. For example, the third-party system 130 can be a state toll authority that controls access to state toll roads.

In this example, the road 105 is a road controlled by a state toll authority, and the sensors are a combination of visual and radio frequency sensors. Typically, a state toll authority requires an account and an RFID tag for proper access to an express lane. If a vehicle is detected without a tag, the license plate is recorded, and a violation is incurred. However, the system 108, provided the third party has entered into a processing agreement with the administrators of the system 108, enables for on-demand access to the third-party resource. For example, a driver may not have an account with a state toll authority, but desires to use the express lane for one occasion. The driver may request the resource through the system 108, as indicated by flow path A, and the system 108 may grant access to the driver by sending the token to third party system 130, as indicated by flow path H. The token will include data that the system 130 can use to detect the vehicle, e.g., the license plate number of the vehicle. Additional data, such as the section of the express lane, the time duration for the allocation, etc., can also be provided. The third-party system 130 then stores this information in the reporting data 132.

The system 108 can notify the driver of the allocated resource, as described above. When the driver utilizes the express lane, the system 130, by means of sensors 102, may record the presences of the vehicle without the RFID tag as a possible violation. However, before determining a violation has occurred, the system 130 accesses the reporting data 132, and determines that the vehicle, based on the license plate number, was allocates use of the express lane, and a violation is not recorded.

Access to the third-party resource may require a fee. If the user has an account with the system 108, the fee can be incurred on the user's account, and the system 108 can transfer a portion of the fee to the third-party system 130 pursuant to a revenue sharing agreement. Otherwise, the user may be required to pay the fee prior to the allocation being granted.

Verification of Resource Allocation

Typically, a resource allocation may have a time and location requirement. For example, a user may be granted access to a particular stretch of an express lane for a certain time duration, e.g., 4:00 PM-7:00 PM, and for a certain portion of the lane, e.g., a fifteen-mile stretch from onramp 123 to exit 456. The token may also include data that describes the resource allocation location and duration requirements, or the system 108 may provide this information with the token. This information may be used to determine whether a vehicle is authorized access to a particular traffic resource.

Figure 4:
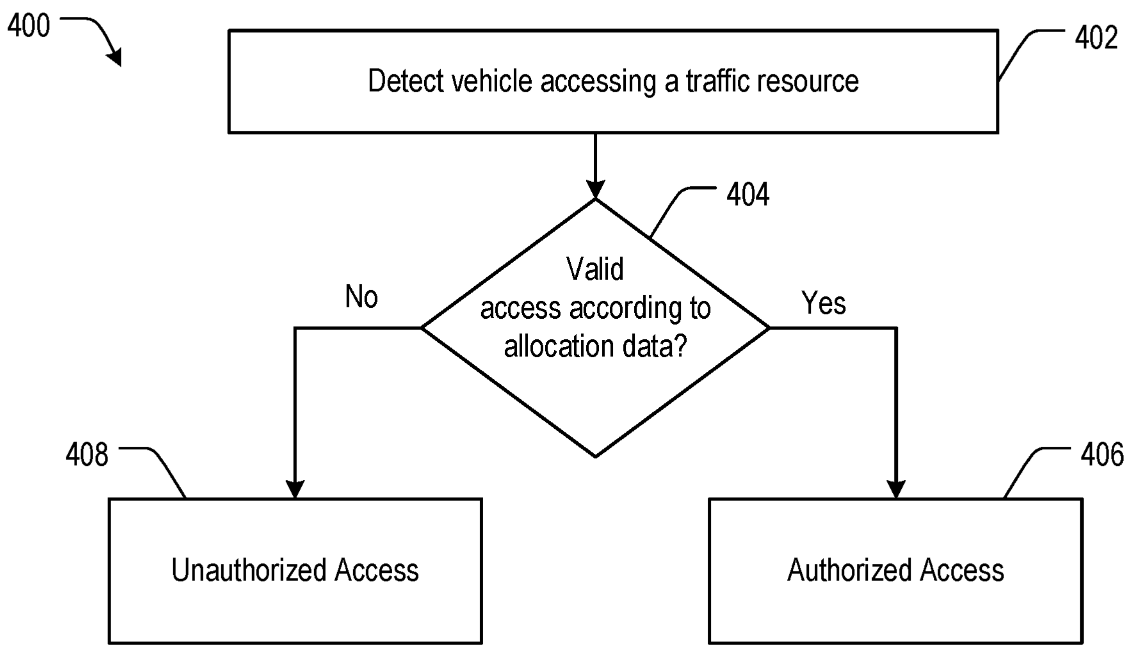
FIG. 4 is a flow diagram of an example process for determining whether access to a resource is valid.

FIG. 4 is a flow diagram of an example process 400 for determining whether access to a resource is valid. The process can be performed the system 108 or by the system 130.

The process 400 detects a vehicle accessing a traffic resource (402). The traffic resource can be an express lane, a reserved lane, a parking space, etc.

The process 400 determines whether the access is valid according to allocation data (404). This can be done, for example, by an allocation monitor 120. For example, data associated with the tracking token for the vehicle may indicate a time duration and geographic area/location for valid access. If the detected vehicle is utilizing the resource within the specified time during and geographic area/location, then the process determines the access is authorized (406). Otherwise, the process 400 determines the access is unauthorized (408).

If the process 400 determines the access is unauthorized, subsequent steps may be taken. For example, if the ITS system 108 has contact information for the mobile device of the driver, the system 108 may send a message to the device noting that the access is unauthorized, and, optionally, why. For example, if the time for access to an express lane has expired, the following text message may be sent: "Your time to use this express lane ended at 7:00 PM, which was five minutes ago. Please exit at the next exit, which is 1,500 feet in front of you." Likewise, if the access to an express lane has expired because the driver has driven beyond the exit designated to exit the express lane, the following text message may be sent: "You were supposed to exit the express lane one mile back. Please exit at the next exit, which is two miles in front of you." Additional steps, such as fees and/or fines, depending on the agency controlling the traffic resource, can also be taken.

User Device Configuration for Resource Allocation Usage

Figure 5:
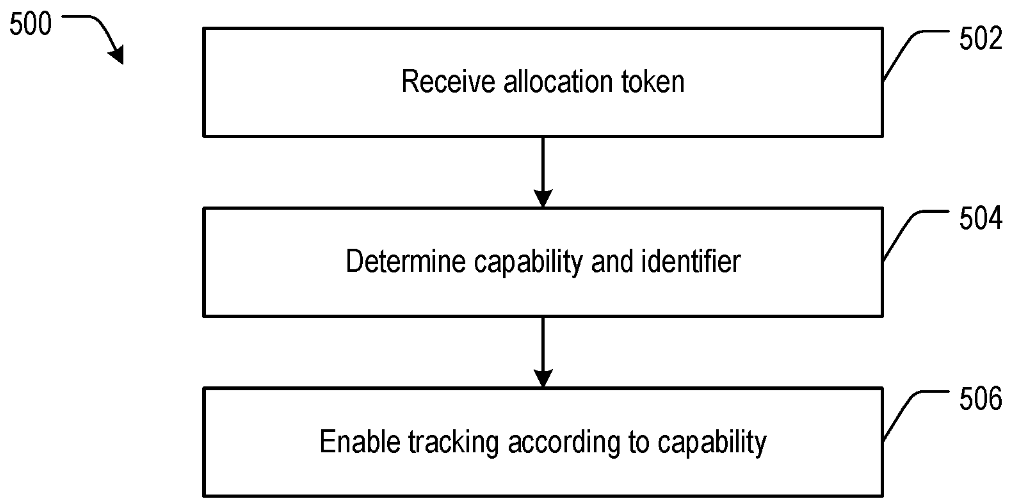
FIG. 5 is a flow diagram of an example process for managing a resource allocation request by a token recipient.

FIG. 5 is a flow diagram 500 of an example process for managing a resource allocation request by a token recipient. The process may be implemented in a user device, such as a mobile phone.

The process 500 receives an allocation token (502). For example, an application on a mobile device may receive the allocation token, and any additional information sent by the system 108. The application may be provided by a provider of the system 108.

The process 500 determines the capability and the identifier (504). For example, the application may parse the token according to the mapping of Table 1 above to determine the tracking capability and the identifier. Alternatively, if the data is provided in a format different from Table 1, a different parsing is used.

The process 500 enables tracking according to the capability (506). For example, the tracking capability may require the device to self-report to the system 108 (as in flow path A-D-E described above) when the device, based on its location, senses the vehicle is utilizing the traffic resource. The device may thus periodically report its location to the system 108. Alternatively, the tracking capability may require the device short-range broadcast an identifier (as in flow path A-D-F-G described above) when the device, based on its location, senses the vehicle is utilizing the traffic resource. The device may thus periodically broadcast the identifier.

Additional Implementation Details

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by a traffic resource allocation system implemented in a data processing apparatus of one or more computers, the method comprising:
- receiving, by the traffic resource allocation system, for each of a plurality of vehicles, a request from a user device for an allocation of a traffic resource for the vehicle in a traffic environment, and for each vehicle:
  - determining, by the traffic resource allocation system, a tracking capability for the vehicle, the tracking capability being one of a plurality of different tracking capabilities, wherein each tracking capability enables a tracking of a vehicle by a tracking method that is unique to the tracking capability and different from each other tracking capability, and the tracking capability is determined without reference to a vehicle device that is pre-associated with the traffic resource allocation system at the time of the request for the allocation;
  - generating, for the vehicle, a tracking token that includes data that describes the tracking capability determined for the vehicle and that enables the traffic resource allocation system to track the vehicle using the tracking token and according to the tracking capability, the data comprising a tuple that includes:
    - a first parameter that has a plurality of values, wherein a value of the first parameter specifies a particular tracking capability;
    - a second parameter that has a value that is used to identify one of the vehicle or device within the vehicle when tracking according to the particular tracking capability specified by the value of the first parameter; and
  - enabling, by the traffic resource allocation system, tracking of the vehicle according to the tracking capability described by the data in the tracking token by configuring one or more hardware devices specific to the tracking capability to perform tracking of the vehicle based on the tracking token;
- wherein, for at least a first vehicle of the plurality of vehicles, a first tracking capability is determined, and for a second vehicle, a second tracking capability different from the first tracking capability is determined, and a first process to track the first vehicle according to the first tracking capability is different from a second process to track the second vehicle according to the second tracking capability.

2. The method of claim 1 wherein the plurality of values for the first parameter includes:
- a first value that specifies an RFID tracking capability;
- a second value that specifies a network address capability; and
- a third value that specifies a license plate number capability.

3. The method of claim 1, wherein enabling, by the traffic resource allocation system, tracking of the vehicle according to the tracking capability described by the data in the tracking token comprises providing, by the traffic resource allocation system, the token to a plurality of sensors that are used to track vehicles that are using the traffic resource.

4. The method of claim 1, wherein enabling, by the traffic resource allocation system, tracking of the vehicle according to the tracking capability described by the data in the tracking token comprises providing, by the traffic resource allocation system, the token to a system that is separate from the traffic resource allocation system and controlled by an entity that is separate from the entity that controls the traffic resource allocation system.

5. The method of claim 1, wherein the traffic resource is an access to a restricted vehicle lane over a pathway.

6. The method of claim 1, further comprising, for each of one or more allocations of a traffic resource:
- generating data describing the traffic resource allocated in response to the request; and
- sending, to a user device, the data describing the traffic resource allocated in response to the request.

7. The method of claim 6, wherein enabling, by the traffic resource allocation system, tracking of the vehicle according to the tracking capability described by the data in the tracking token comprises providing, by the traffic resource allocation system, the token to a mobile phone device of a user that sent the request for an allocation of a traffic resource for the vehicle.

8. A system, comprising:
- a data processing apparatus comprising one or more computers;
- a non-transitory computer readable medium storing instructions executable by the data processing apparatus and that upon such execution cause the data processing apparatus to perform operations comprising:
  - receiving, by the traffic resource allocation system, for each of a plurality of vehicles, a request from a user device for an allocation of a traffic resource for the vehicle in a traffic environment, and for each vehicle:
  - determining, by the traffic resource allocation system, a tracking capability for the vehicle, the tracking capability being one of a plurality of different tracking capabilities, wherein each tracking capability enables a tracking of a vehicle by a tracking method that is unique to the tracking capability and different from each other tracking capability, and the tracking capability is determined without reference to a vehicle device that is pre-associated with the traffic resource allocation system at the time of the request for the allocation;

generating, for the vehicle, a tracking token that includes data that describes the tracking capability determined for the vehicle and that enables the traffic resource allocation system to track the vehicle using the tracking token and according to the tracking capability, the data comprising a tuple that includes:

a first parameter that has a plurality of values, wherein a value of the first parameter specifies a particular tracking capability;

a second parameter that has a value that is used to identify one of the vehicle or device within the vehicle when tracking according to the particular tracking capability specified by the value of the first parameter; and enabling, by the traffic resource allocation system, tracking of the vehicle according to the tracking capability described by the data in the tracking token by configuring one or more hardware devices specific to the tracking capability to perform tracking of the vehicle based on the tracking token;

wherein, for at least a first vehicle of the plurality of vehicles, a first tracking capability is determined, and for a second vehicle, a second tracking capability different from the first tracking capability is determined, and a first process to track the first vehicle according to the first tracking capability is different from a second process to track the second vehicle according to the second tracking capability.

9. The system of claim 8, wherein the plurality of values for the first parameter includes:

a first value that specifies an RFID tracking capability;

a second value that specifies a network address capability; and a third value that specifies a license plate number capability.

10. The system of claim 8, wherein enabling, by the traffic resource allocation system, tracking of the vehicle according to the tracking capability described by the data in the tracking token comprises providing, by the traffic resource allocation system, the token to a plurality of sensors that are used to track vehicles that are using the traffic resource.

11. The system of claim 8, wherein enabling, by the traffic resource allocation system, tracking of the vehicle according to the tracking capability described by the data in the tracking token comprises providing, by the traffic resource allocation system, the token to a system that is separate from the traffic resource allocation system and controlled by an entity that is separate from the entity that controls the traffic resource allocation system.

12. The system of claim 8, wherein the traffic resource is an access to a restricted vehicle lane over a pathway.

13. The system of claim 8, the operations further comprising, for each of one or more allocations of a traffic resource:

generating data describing the traffic resource allocated in response to the request; and sending, to a user device, the data describing the traffic resource allocated in response to the request.

14. The system of claim 13, wherein enabling, by the traffic resource allocation system, tracking of the vehicle according to the tracking capability described by the data in the tracking token comprises providing, by the traffic resource allocation system, the token to a mobile phone device of a user that sent the request for an allocation of a traffic resource for the vehicle.

15. A non-transitory computer readable medium storing instructions executable by a data processing apparatus and that upon such execution cause the data processing apparatus to perform operations comprising:

receiving, by the traffic resource allocation system, for each of a plurality of vehicles, a request from a user device for an allocation of a traffic resource for the vehicle in a traffic environment, and for each vehicle:

determining, by the traffic resource allocation system, a tracking capability for the vehicle, the tracking capability being one of a plurality of different tracking capabilities, wherein each tracking capability enables a tracking of a vehicle by a tracking method that is unique to the tracking capability and different from each other tracking capability, and the tracking capability is determined without reference to a vehicle device that is pre-associated with the traffic resource allocation system at the time of the request for the allocation;

generating, for the vehicle, a tracking token that includes data that describes the tracking capability determined for the vehicle and that enables the traffic resource allocation system to track the vehicle using the tracking token and according to the tracking capability, the data comprising a tuple that includes:

a first parameter that has a plurality of values, wherein a value of the first parameter specifies a particular tracking capability;

a second parameter that has a value that is used to identify one of the vehicle or device within the vehicle when tracking according to the particular tracking capability specified by the value of the first parameter; and enabling, by the traffic resource allocation system, tracking of the vehicle according to the tracking capability described by the data in the tracking token by configuring one or more hardware devices specific to the tracking capability to perform tracking of the vehicle based on the tracking token;

wherein, for at least a first vehicle of the plurality of vehicles, a first tracking capability is determined, and for a second vehicle, a second tracking capability different from the first tracking capability is determined, and a first process to track the first vehicle according to the first tracking capability is different from a second process to track the second vehicle according to the second tracking capability.

* * * * *